United States Patent
Ohishi et al.

(10) Patent No.: US 6,222,534 B1
(45) Date of Patent: *Apr. 24, 2001

(54) ARTICLE POSTING APPARATUS, ARTICLE RELATIONSHIP INFORMATION MANAGING APPARATUS, ARTICLE POSTING SYSTEM, AND RECORDING MEDIUM

(75) Inventors: Kazuhiro Ohishi; Takahiro Kii; Kyoko Okuyama; Naomi Iwayama, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/001,188

(22) Filed: Dec. 30, 1997

(30) Foreign Application Priority Data

Sep. 4, 1997 (JP) ............................................. 9-239662

(51) Int. Cl.[7] ........................................................ G06F 3/00
(52) U.S. Cl. ........................... 345/331; 345/329; 707/501; 709/203
(58) Field of Search .................................... 345/348, 349, 345/356, 331, 332, 330, 329, 342; 707/517, 514, 501, 513, 520; 709/203

(56) References Cited

U.S. PATENT DOCUMENTS

| | | | | |
|---|---|---|---|---|
| 4,974,173 | * | 11/1990 | Stefik ................................... | 345/331 |
| 5,107,443 | * | 4/1992 | Smith ................................... | 345/331 |
| 5,144,555 | * | 9/1992 | Takadachi et al. .................. | 707/330 |
| 5,202,828 | * | 4/1993 | Vertelney et al. ................... | 707/530 |
| 5,204,947 | * | 4/1993 | Bernstein ............................. | 707/501 |
| 5,383,111 | * | 1/1995 | Homma et al. ...................... | 705/27 |
| 5,689,666 | * | 11/1997 | Berquist et al. ..................... | 345/342 |
| 5,689,718 | * | 11/1997 | Sakurai et al. ...................... | 707/517 |
| 5,694,594 | * | 12/1997 | Chang .................................. | 707/501 |
| 5,721,851 | * | 2/1998 | Cline .................................... | 707/501 |
| 5,799,292 | * | 8/1998 | Hekmatpour ........................ | 707/501 |
| 5,815,663 | * | 9/1998 | Uomini ................................. | 709/219 |
| 5,819,040 | * | 10/1998 | Ogaki et al. ......................... | 707/500 |
| 5,835,091 | * | 11/1998 | Bailey et al. ........................ | 345/342 |
| 5,855,015 | * | 12/1998 | Shoham ................................ | 707/5 |
| 5,874,953 | * | 2/1999 | Webster ............................... | 345/329 |
| 5,874,962 | * | 2/1999 | Judicibus et al. ................... | 345/342 |
| 5,880,725 | * | 3/1999 | Southgate ............................ | 345/342 |
| 5,895,475 | * | 4/1999 | Eisenberg ............................ | 707/517 |
| 5,900,002 | * | 5/1999 | Bottomly ............................. | 707/517 |
| 5,930,809 | * | 7/1999 | Middlebrook ....................... | 707/501 |
| 5,953,733 | * | 9/1999 | Langford-Wilson ................ | 707/517 |
| 6,014,138 | * | 1/2000 | Cain et al. ........................... | 345/335 |
| 6,054,987 | * | 4/2000 | Richardson et al. ............... | 345/348 |
| 6,075,531 | * | 6/2000 | DeStefano .......................... | 345/340 |

\* cited by examiner

Primary Examiner—Raymond J. Bayerl
Assistant Examiner—Thomas J Joseph
(74) Attorney, Agent, or Firm—Staas & Halsey LLP

(57) ABSTRACT

The system enables a user to dispose information such as an icon to identify the article that the user posts from the client computer, on the display screen thereof, for example, at the position closer to an icon of an article that another user posted if the former user intends to express the opinion positively to the latter user's posted article. The server computer where many client computers can post articles and read the articles posted from other client computers, manages the coordinate data of the icons respectively disposed at the client computers according to the respective intentions of the articles and reproduces the icons on the display screen of a client computer, at the respective disposed positions so that a user at the client computer can instantly understand the intentions of the posted articles without reading the contents thereof.

11 Claims, 9 Drawing Sheets

F I G. 1
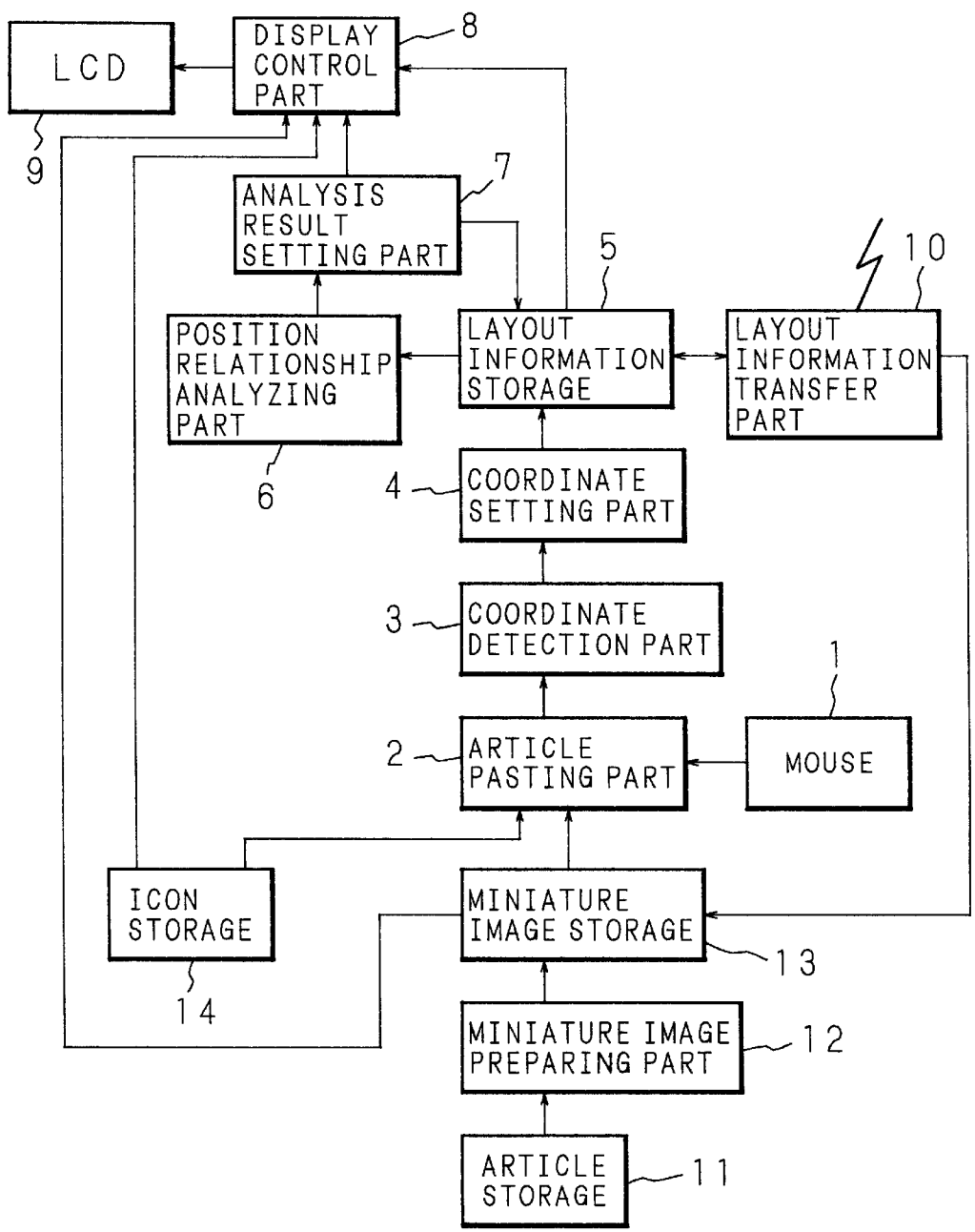

FIG. 2

| ARTICLE NO. | ATTRIBUTE | | | | | |
|---|---|---|---|---|---|---|
| | COORDINATE | COLOR | TEXT | ICON | POSTING DATE | MINIATURE IMAGE STORED ADDRESS |
| article01 | (X1,Y1) | BLACK | abc... | (No.1) | 1997.9.1 | AAAA |
| article02 | (X2,Y2) | BLACK | def... | (No.3) | 1997.9.2 | BBBB |
| ... | | | | | | |

ARTICLE POSTING APPARATUS, ARTICLE RELATIONSHIP INFORMATION MANAGING APPARATUS, ARTICLE POSTING SYSTEM, AND RECORDING MEDIUM

BACKGROUND OF THE INVENTION

The present invention relates to an article posting apparatus such as a personal computer (hereinafter to be referred to as PC) for referring to articles posted, for example, on a network like a Internet and for posting an article therein. The invention relates to an apparatus for managing information indicating the relationship between the posted articles, an article posting system comprising a plurality of article posting apparatuses for referring to the posted articles and for posting articles and an apparatus for managing information indicating the relationship between the posted articles, and a recording medium which is readable by the article posting apparatus.

There has been commonly used a communication system to exchange opinions with many people by referring to or posting articles through PCs connected to networks such as the Internet, PC communication, etc. In such a communication system, when the number of the participants increases so that the number of articles increases, the relationship between the articles become ambiguous such that to which article the opinion of the posted article is directed. Accordingly, it is inconvenient in that the user is required to read the contents by decompressing the article when referring to articles.

In order to relieve such inconveniences, in the conventional communication system by PC communication there is provided a service to show the relationship of the posted articles such that the posted article is the opinion to which article, in a hierarchical tree structure according to the posting order.

However, according to the service as above provided by the system side, though the relationship between the articles is clarified, the intention of the posting user is not expressed as to whether the posting user intends to take a leading part in discussion by expressing the opinion positively to some other user's article, or the user just desires to give opinion as an observer with a slight distance from the center of discussion, or the user states the opinion related with the topics though not directed to the specific article. Accordingly, in order to know the posting user's intention, it is necessary to decompress the article once and read the contents thereof.

BRIEF SUMMARY OF THE INVENTION

The present invention has been made with a view to solve the above points. An object of the invention is to provide an article posting apparatus such as a PC which enables a user to grasp the invention of a posting user intuitively according to the position where article identification information is disposed on a display screen, an apparatus for managing information which indicates the relationship between posted articles, an article posting system constituted by the article posting apparatus and the apparatus for managing the information indicating the relationship between posted articles, and a recording medium which is readable by the above-mentioned article posting apparatus, by providing an expedient to the posting user for enabling to dispose the article identification information such as icon or a miniature image of the image attached to the article on the position of the display screen which suits the intention of the posting user, and displaying the article identification information of the articles posted from plural article posting apparatus on the screens of the plural article posting apparatuses corresponding to the positions where the posting user pasted the information based on the coordinate data of the article identification information.

In the present invention, there is provided an method for allowing the user to dispose the identification information of the article such as the icon or the miniature image of the image attached to the article, etc. Further, the article identification information is displayed on the position, corresponding to the coordinate data, of the display screen of the article posting apparatus such as a PC of the user who has had access to the network to refer to or post the article, so that, without necessitating to decompress the article, the relationship between the posted articles, especially the relationship concerned with the user s posting intention can be intuitively grasped.

Also, in the present invention, in addition to the coordinate data of the article identification information, the information showing the posting order of articles such as the posted date, posted time, etc. is stored, so that even when other article identification information is disposed to overlap the identification information of the already posted article, the overlapping condition can be reproduced.

Furthermore, in the present invention, the position relationship between the article identification information of the already posted article and of the newly posted article is analyzed from the coordinate data, and the display condition is changed in such a way that, for example, in case of the information of the two articles being disposed in extremely close positions, they are to be displayed in the same color, thereby making it easier to grasp the relationship between the articles.

The above and further objects and features of the invention will more fully be apparent from the following detailed description with accompanying drawings.

BRIEF DESCRIPTION OF THE SEVERAL VIEWS OF THE DRAWINGS

FIG. 1 is a block diagram of an article posting apparatus of the present invention;

FIG. 2 is a conceptual view of the stored condition of layout information;

DETAILED DESCRIPTION OF THE INVENTION

Figure 3:
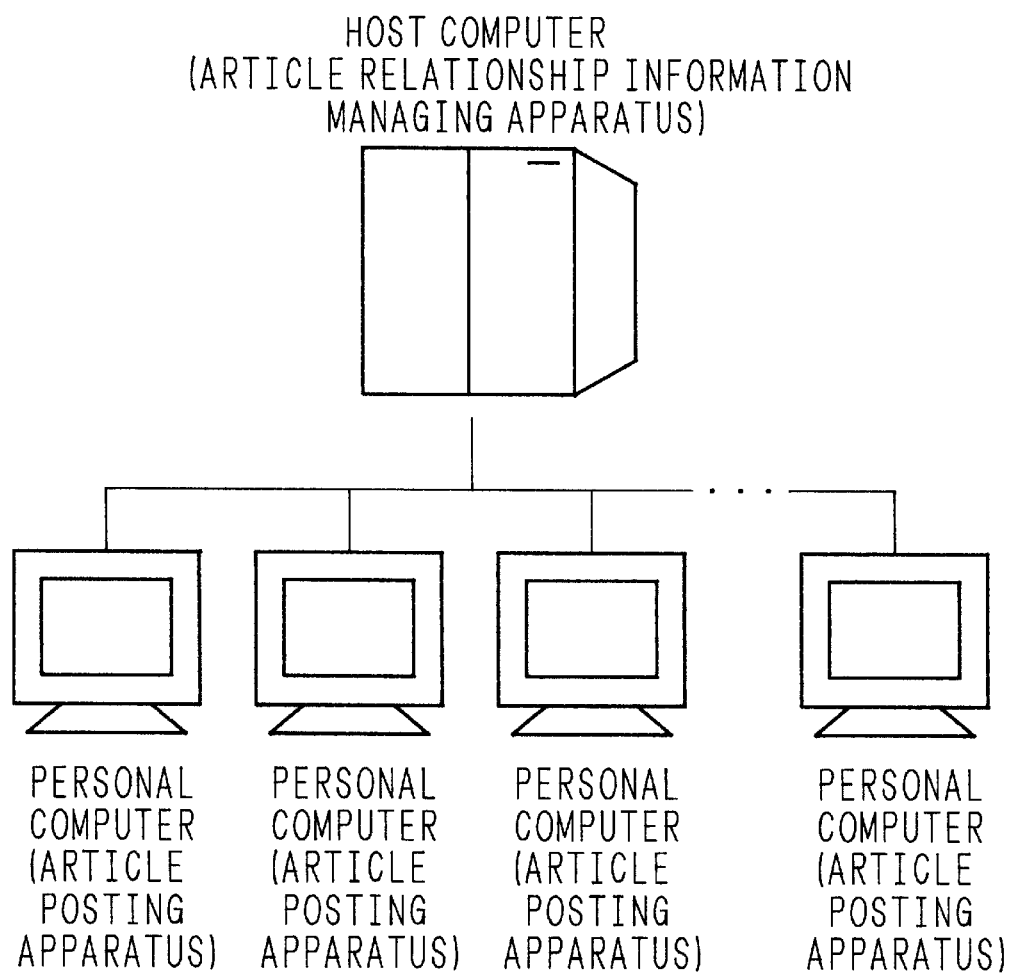
FIG. 3 is a conceptual view of an article posting system of the present invention.

FIG. 1 is a block diagram of PC as an article posting apparatus of the present invention.

In the figure, numeral 11 denotes an article storage for storing articles. A miniature image preparing part 12 prepares article identification information of miniature images for identifying the article by reducing an image accompanying the article stored in the article storage 11 and stores it in a miniature image storage 13. An icon storage 14 stores icons as the identification information of article.

A mouse 1 is means for arranging the article identification information of the icon stored in the icon storage 14 or of the miniature image stored in the miniature image storage 13 on an LCD 9 which is a display screen by an operation such as a drag and drop. An article pasting part 2 pastes the article identification information on the position of the LCD 9 clicked by the mouse.

A coordinate detection part 3 detects the coordinate data (X, Y) of the position on LCD 9 on which the article identification information is pasted by the article pasting part 2. A coordinate setting part 4 sets the coordinate data detected by the coordinate detection part 3 in a layout information storage 5 which stores attribute information of the article identification information.

FIG. 2 is a conceptual view of the stored state of the layout information which is the article relationship information in the layout information storage 5, wherein the article identification information of each article is managed by the article number. In this example, color, text, icon kind, and date and time of posting the article are stored as the attribute information, in addition to the coordinate data. Also, a stored address in the miniature image storage 13 is stored, in relation to the article number, of the miniature image as the article identification information transferred to a layout information transfer part 10 from the article relationship information managing apparatus for managing the information indicating the relationship between the articles posted from plural article posting apparatuses and of the miniature image as the article identification information pasted by the article pasting part 2.

The position relationship analyzing part 6 analyzes the position relationship between the identification information of the plural articles, e.g. a distance on referring to the stored data in the layout information storage 5. An analysis result setting part 7 sets the information according to the analysis result by the position relationship analyzing part 6 in the layout information storage 5, and gives this information to a display control part 8.

For example, in case the article identification information of the currently posted article is disposed on the position fairly close to the article identification information of the already posted article, the identification information of the both are displayed in the same color, or enclosed with frames of the same color, etc., thereby setting the information to change the display condition in the layout information storage 5, and giving the changing information to the display control part 8.

The display control part 8 displays the article identification information on the position of the LCD 9 and under the display condition according to the layout information stored in the layout information storage 5, and in case that information such as color information which requires change of the display condition is given from the analysis result setting part 7, the display condition of the article identification information on the LCD 9 is changed according to such information.

Further, in case of allowing the overlapped display of the article identification information, the display control part 8 can display the identification information of the plural articles under the original overlapped condition by displaying the identification information in order of the posted date and time which are stored as the layout information.

The layout information transfer part 10 stores, at the time of log in to the network or displaying an article retrieve screen, the position information transferred from the article relationship information managing apparatus for managing the information which indicates the relationship between the articles posted from plural article posting apparatuses, in the layout information storage 5, and stores the storing address in the miniature image storage 13 where the miniature image as the transferred article identification information is stored, and also, at the time of log out from the network, transfers the layout information stored in the layout information storage 5 to the article relationship information managing apparatus.

FIG. 3 is a conceptual view of the article posting system according to the present invention constituted by a plurality of the above-mentioned article posting apparatuses and a host computer as the article relationship information managing apparatus for storing the layout information to be transferred from the article posting apparatuses connected thereto, and transferring the layout information transferred from the article posting apparatuses to the article posting apparatus which has access to the network to refer to or post an article.

Figure 4:
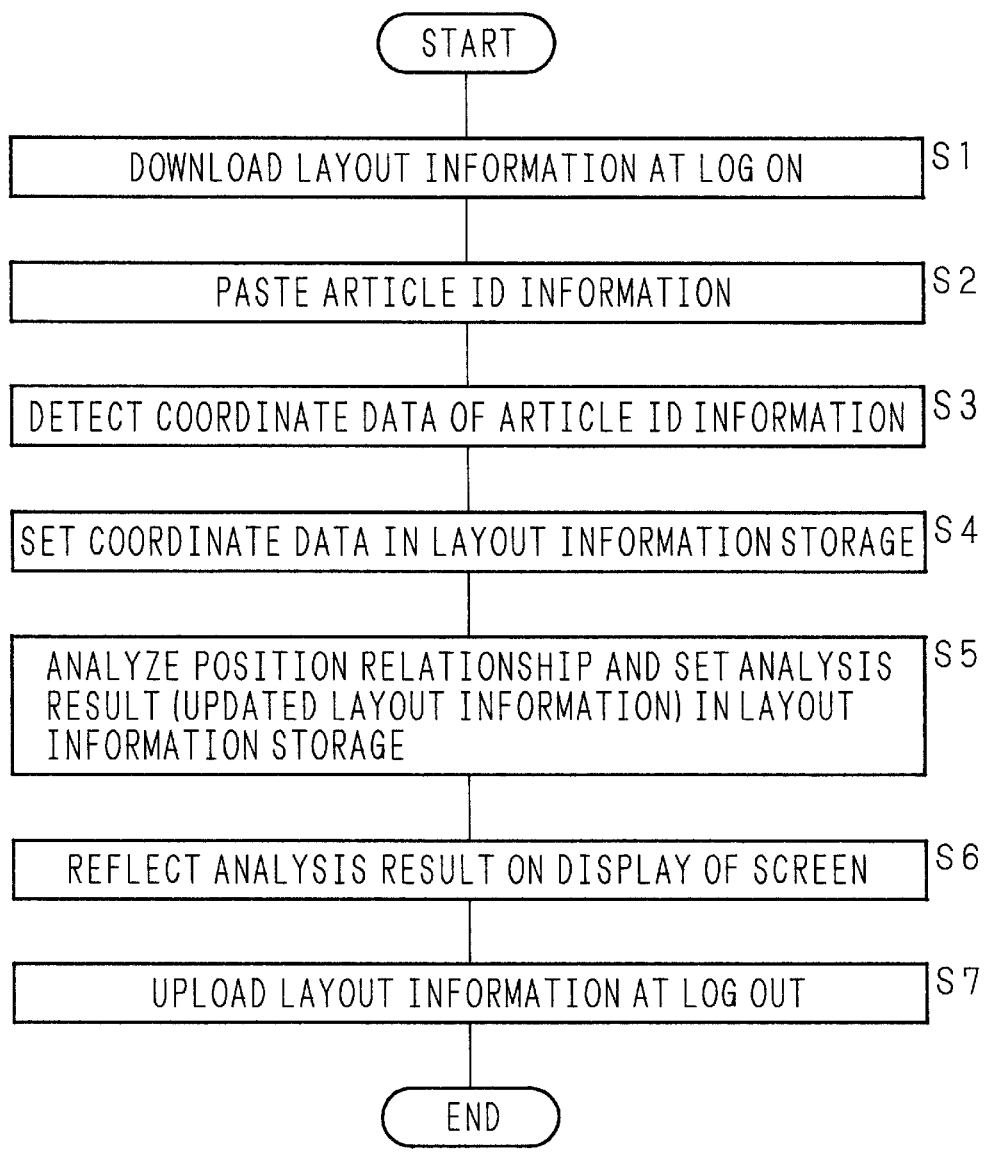
FIG. 4 is a flow chart of the operation in the present invention when posting the article.

The operation at the article posting in the article posting system of the present invention will be described below based on the flow chart of FIG. 4.

When the article posting apparatus has access to the network system to log in the service of the system in order to refer to or post an article, the layout information is downloaded to the PC through the layout information transfer part 10 PC from the host computer which manages the layout information representing the relationship between the articles posted from plural article posting apparatuses (Step S1).

When the position to dispose the article identification information is determined by the drag and drop operation by the mouse 1, the article pasting part 2 pastes the article identification information to this position (Step S2). The coordinate detection part 3 detects the coordinate data of the pasted article identification information (Step S3), the coordinate setting part 4 sets the coordinate data in the layout information storage 5 (Step S4). The display control part 8 displays the article identification information on the LCD 9 under the layout condition of the position according to the coordinate data stored in the layout information storage 5, color, overlap condition, etc.

Next, the position relationship analyzing part 6 analyzes the positional relationship between the articles on referring to the layout information in the layout information storage 5, and the analysis result setting part 7 sets the analysis result in the layout information storage 5 (Step S5). When any change occurs to the layout information, the analysis result setting part 7 gives the change information to the display control part 8. Then the display control part 8 reflects the analysis result on the display condition on the LCD 9 (Step S6).

At the time of log out from the service of the system, the layout information in the layout information storage 5 is uploaded to the host computer which manages the article relationship information from the layout information transfer part 10 (Step S7), and the host computer stores the layout information in the memory.

Figure 5:
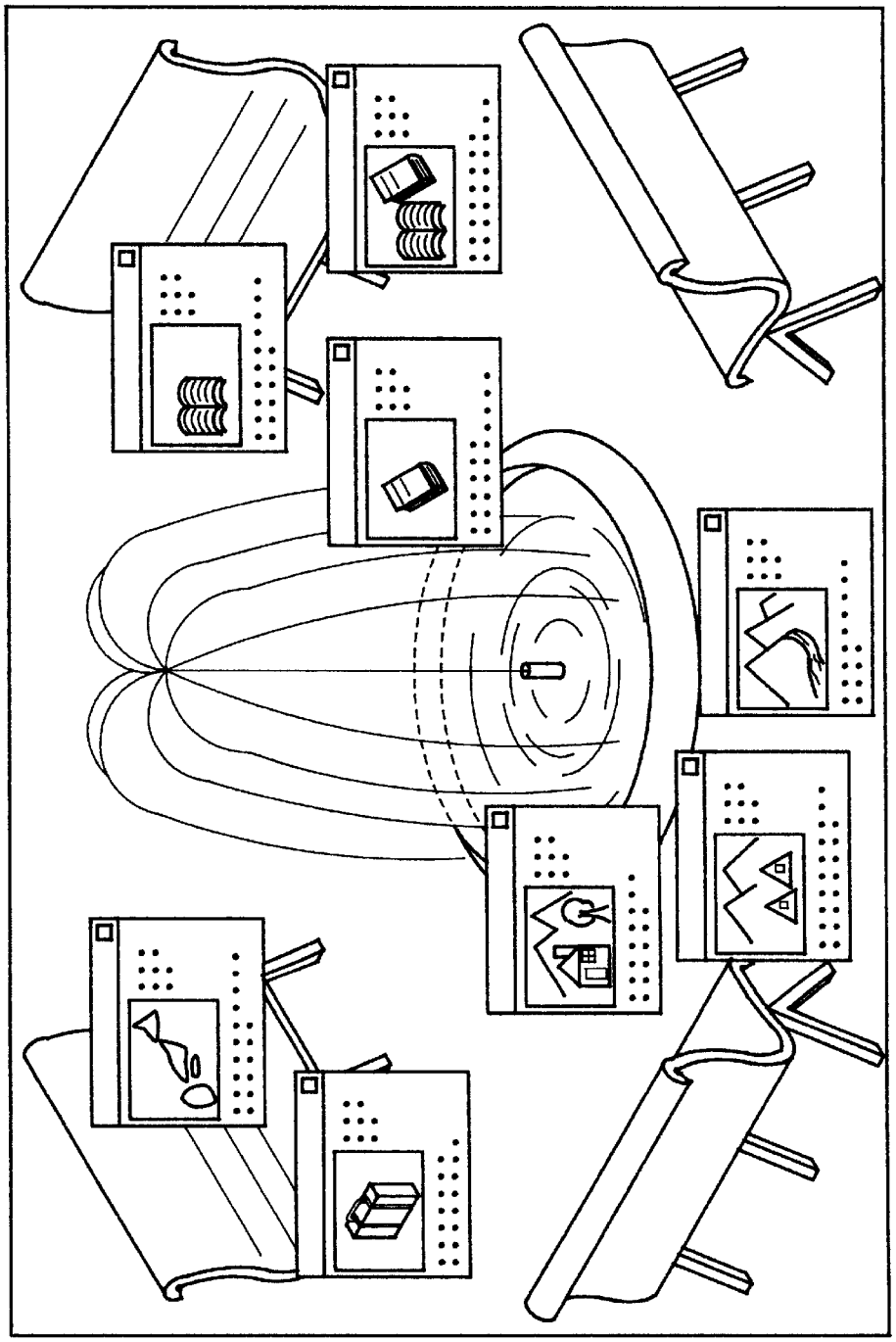
FIG. 5 is a view showing an example of screen display of the present invention (No. 1)
Figure 6:
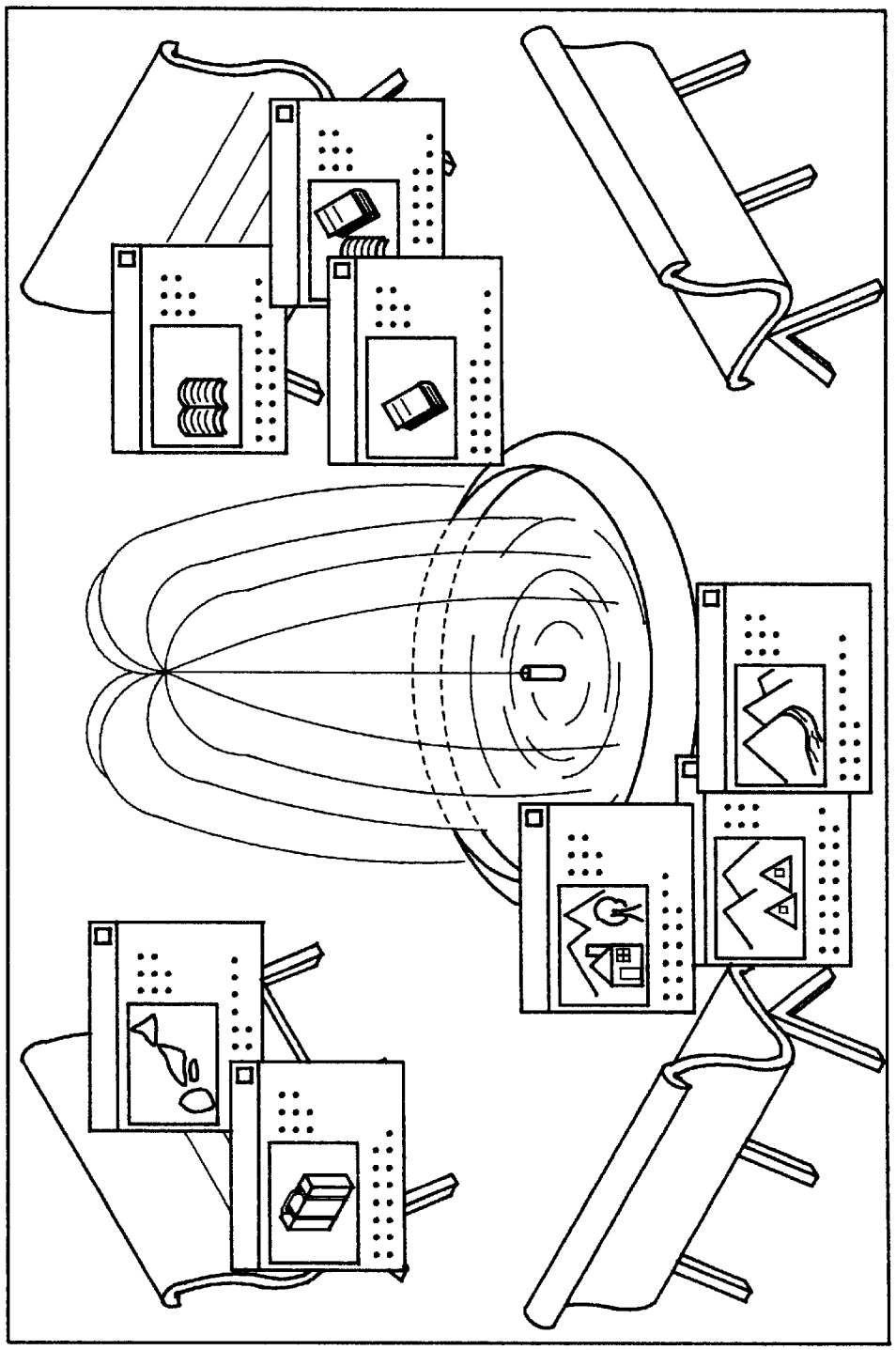
FIG. 6 is a view showing an example of screen display of the present invention (No. 2)
Figure 7:
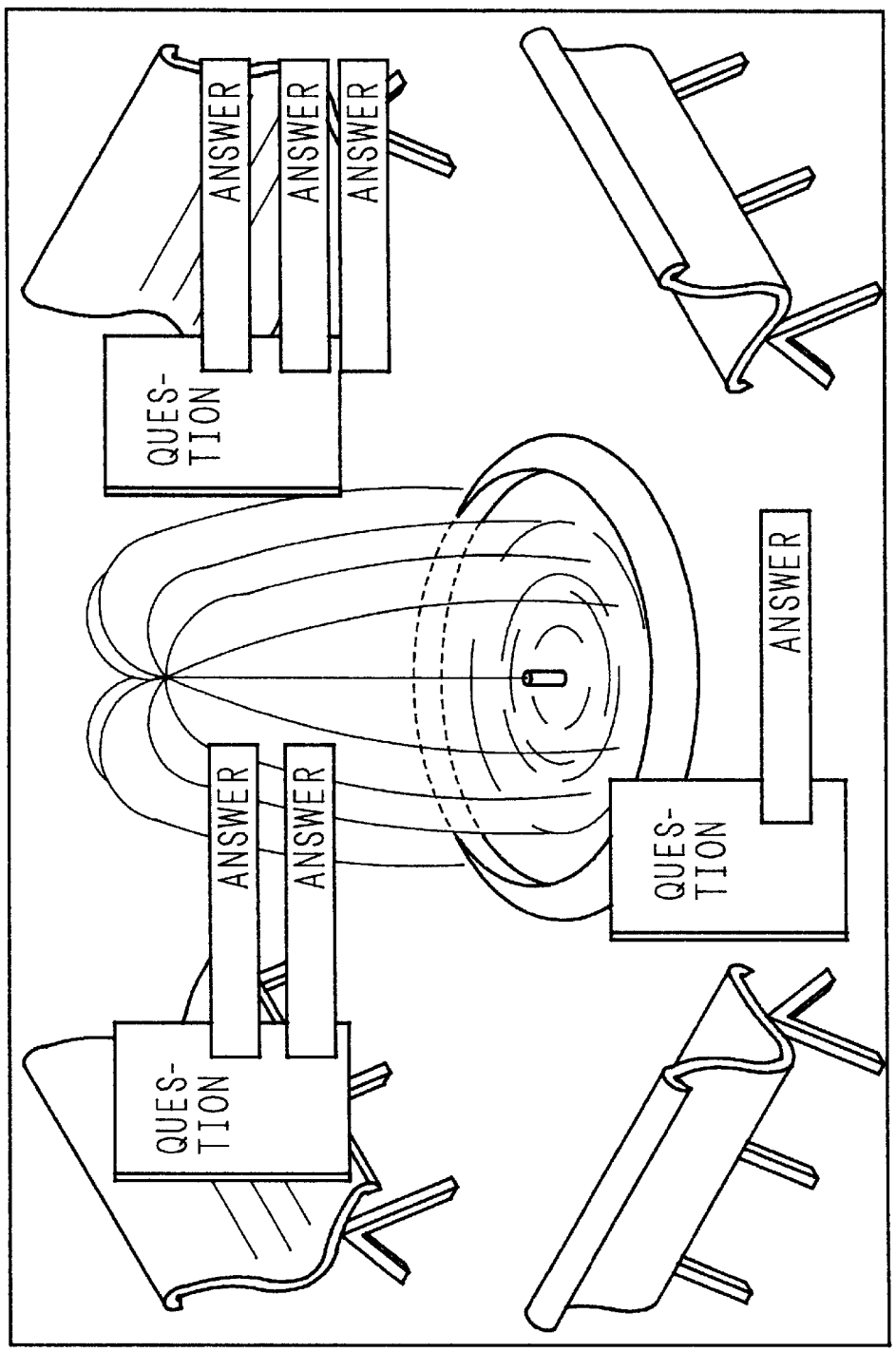
FIG. 7 is a view showing an example of screen display of the present invention (No. 3)

FIGS. 5 to 7 are the drawings showing the screen display examples of the article identification information in the article posting apparatus of the present invention.

FIG. 5 is an example of the screen display in the case of disposing the article identification information which is miniature information of image information attached to an article without overlapping. It can be intuitively grasped that the articles with the article identification information being disposed at relatively close positions are posted on the same theme, and moreover, the miniature images do not overlap each other, so that they can be easily viewed.

On the other hand, FIG. 6 shows an example of screen display in the case of allowing the user to dispose the miniature images overlapping each other. The articles with the article identification information disposed in overlapped state are posted on the same theme, so that the identification information of a great many articles can be disposed. Further, depending on the extent of the overlap or whether being disposed with an overlap or in the extreme vicinity with no overlap, it is possible to grasp intuitively the extent of the participation in the article.

FIG. 7 shows an example of screen display by the icons of the different shapes depending on the contents of the article. In case the article is a question, a note type icon is used, and in case the article answers a question, a tag type icon is used. Since the user inevitably disposes the tag type icon to be attached onto the note type icon of the corresponding question when posting an article of an answer, the corresponding relationship can be intuitively grasped.

Besides these miniature images and icons, the text information such as the name of the person who posted the article, title of the article, etc. may be used as the article identification information. Alternatively, plural kinds of attribute information may be combined.

Figure 8:
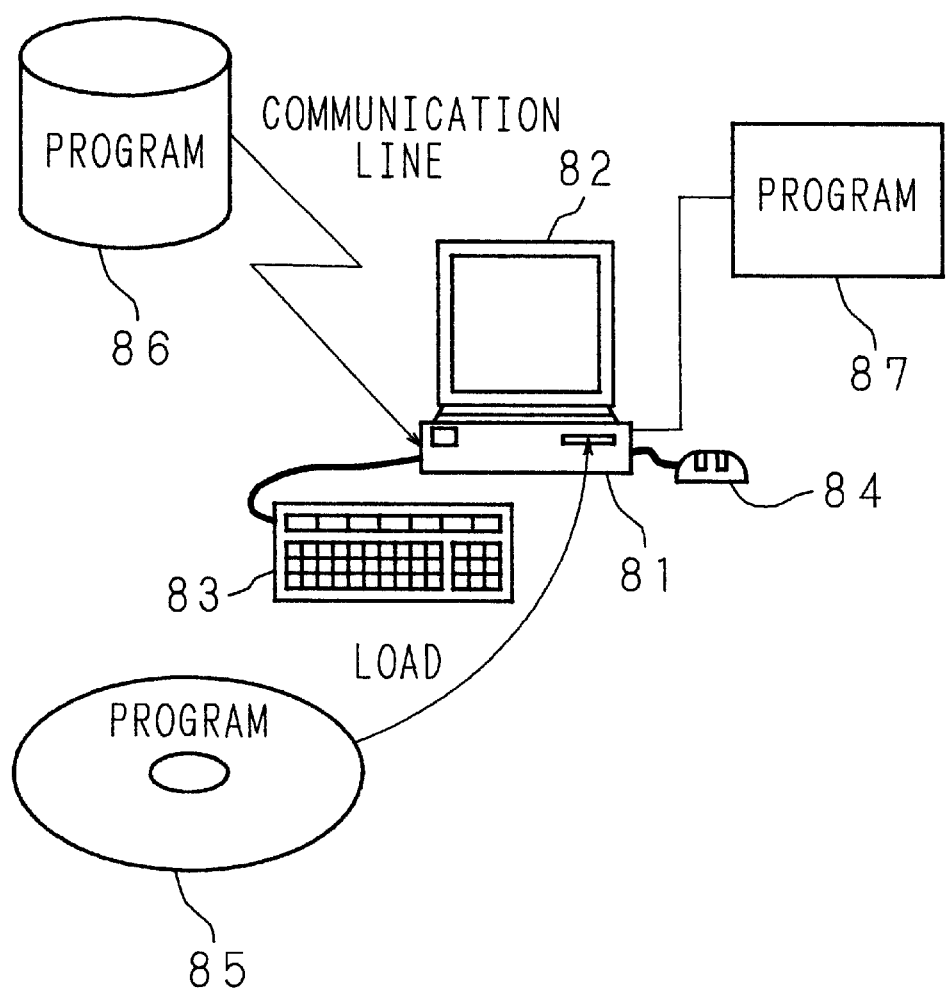
FIG. 8 is a schematic diagram showing a hardware constitution for realizing the present invention system.

FIG. 8 is a schematic view showing the hardware constitution for realizing the system of the present invention. This hardware is equipped with a personal computer 81 as a processing apparatus, a display 82 for displaying the character data, etc., and a keyboard 83 and a mouse 84 as input devices. The personal computer 81 loads the program for carrying out the processing as described above from the recording media including the portable type recording media 85 such as magnetic disk, CD-ROM, for example line memory 86 provided at the center with which the program can be transferred to with the personal computer 81 by wireless or by cable, or RAM provided on the personal computer 81, processing side memory 87 such as a hard disk.

Figure 9:
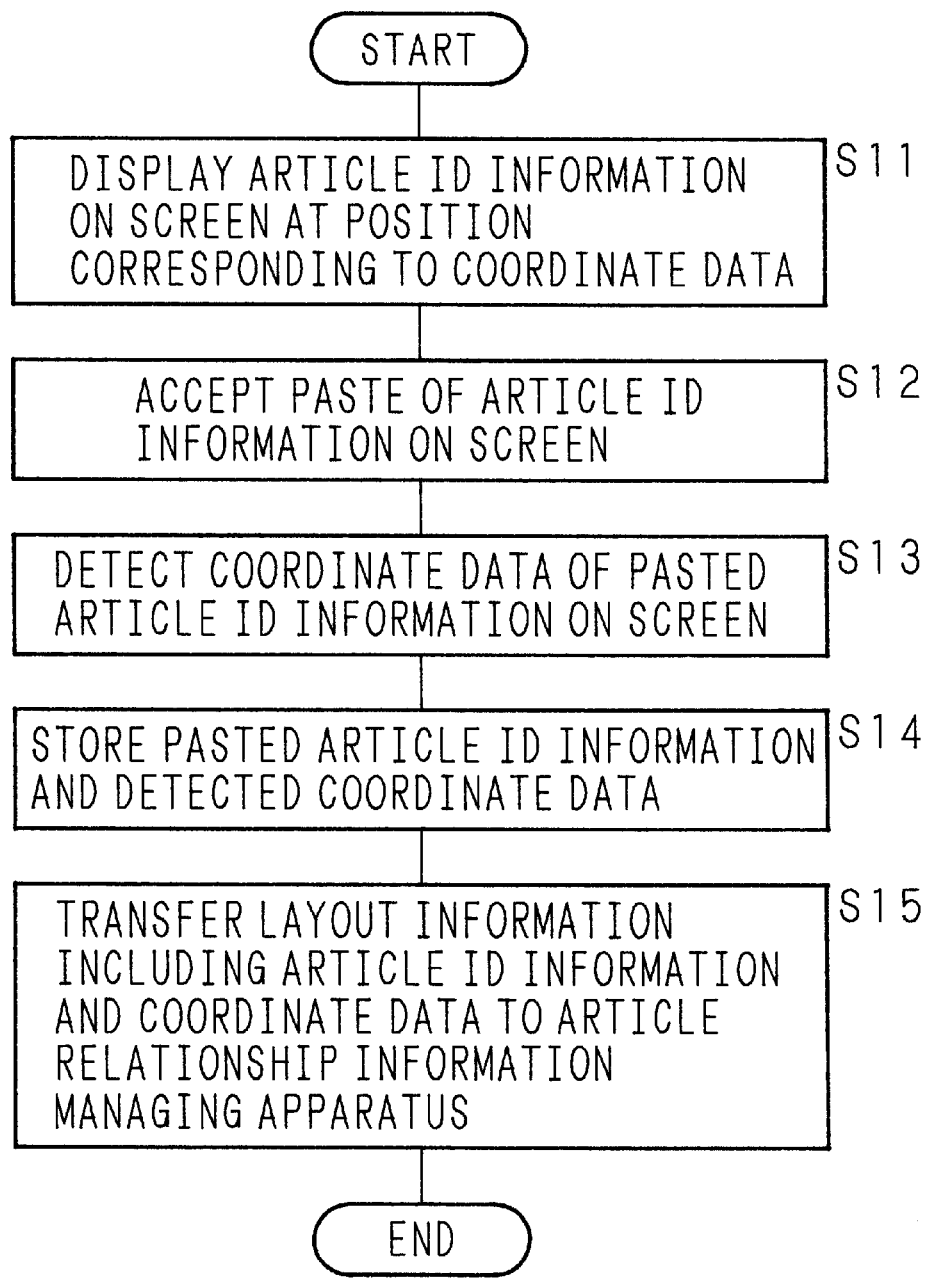
FIG. 9 is a flow chart showing the processing procedures of the program in the recording medium of the present invention.

FIG. 9 is a flow chart showing the procedures for processing the program in the recording medium of the present invention.

The procedures comprise the steps of causing the article posting apparatus to display the article identification information on the display screen at the position corresponding to the coordinate data (Step S11), to accept the disposition of the article identification information by the user on the display screen (Step S12), to detect the coordinate data on the display screen of the disposed article identification information (Step S13), to store the disposed article identification information and the detected coordinate data in the memory (Step S14), and to transfer the stored article identification information and layout information including the coordinate data to the article relationship information managing apparatus (Step S15).

As this invention may be embodied in several forms without departing from the spirit of essential characteristics thereof, the present embodiment is therefore illustrative and not restrictive, since the scope of the invention is defined by the appended claims rather than by the description preceding them.

What is claimed is:

1. An article posting apparatus for posting an article, or for referring to a posted article, comprising:
   a display screen;
   means for preparing article identification information for identifying an article to be posted;
   means for allowing a user to dispose the article identification information at a position on the display screen desirable to the user;
   means for accepting the article identification information displayed at [a] the position on the display screen;
   means for detecting coordinate data of the article identification information based on position of the article identification information on the display screen;
   means for storing the article identification information displayed on the display screen, a detected coordinate data thereof and information which represents a posting order of the articles, wherein
   the means for storing retains the article identification information, the detected coordinate data, and the information which represents the posting order, after the article identification information is no longer displayed;
   means for transferring data stored by the means for storing to an apparatus for managing information indicating a relationship of the articles posted from a plurality of article posting apparatuses and including information relating to the disposed positions of the article identification information, as defined by coordinate data thereof; and
   means for displaying the article identification information on a different display screen at a position corresponding to the transferred coordinate data and overlaps the article identification information in an order corresponding to the transferred posting order information.

2. An apparatus according to claim 1, further comprising means for analyzing a relationship between positions of the article identification information by referring to the stored data, means for storing a result of analysis by said analyzing means, and means for changing the display of said article identification information according to the result of said analysis.

3. An apparatus for managing information related to the position relationship of article identification information of articles which represent the respective intentions of the posting users of the articles posted from a plurality of article posting apparatuses connected to the network, comprising:
   first means for storing article identification information for identifying a posted article and coordinate data of said article identification information, and information related to the position relationship of article identification information of an article with other posted articles which represents the intention of the article posting user transferred from an article posting apparatus which includes
   a display screen;
   means for storing the article identification information and the coordinate data of said article identification information, and the information related to the position relationship of article identification information of an article with other posted articles which represents the intention of the article posting user transferred from the article relationship information managing apparatus;
   means for displaying the article identification information on a display screen at a position corresponding to the coordinate data of said identification information;

means for preparing the article identification information of the article to be posted; means for accepting the disposition on the display screen of the article identification information of an article to be posted;

means for detecting the coordinate data on the display screen of the article identification information disposed on the display screen;

second means for storing the article identification information disposed on the display screen and the detected coordinate data of said article identification information, wherein the second means for storing retains the article identification information, the detected coordinate data after the article identification information is no longer displayed and information which represents posting order;

means for transferring the stored data by said second storing means to said apparatus for managing the article relationship information; and means for transferring the stored data by said first storing means to the article posting apparatus having access to the network for referring to or posting an article.

4. An article posting system comprising:

(a) an article posting apparatus which includes a display screen;

means for storing article identification information for identifying a posted article, coordinate data of said article identification information, and the information related to the position relationship of article identification information of an article with other posted articles which represents the intention of the article posting user transferred from an article relationship information managing apparatus, and information which represents a posting order of the articles;

means for displaying the article identification information on a display screen at a position corresponding to the coordinate data of said identification information and overlaps the article identification information in an order corresponding to the transferred posting order information, after the article identification information is no longer displayed;

means for preparing the article identification information of the article to be posted;

means for allowing a user to dispose the article identification information at a position on the display screen desirable to the user;

means for detecting coordinate data on the display screen of the article identification information disposed on the display screen;

means for storing the article identification information disposed on the display screen, and the detected coordinate data of said article identification information; and means for transferring the stored data by said storing means to said apparatus for managing an article relationship information, (b) the article relationship information managing apparatus for managing information related to the position relationship of article identification information of articles which represent the respective intentions of the posting users of the articles posted from a plurality of article posting apparatuses connected to the network, which includes means for storing the article identification information, the coordinate data, and information related to the position relationship of article identification information of an article with other posted articles which represents the intention of the article posting user transferred from the article posting apparatus; and means for transferring the stored data by said storing means to an article posting apparatus having access to the network for referring to or posting an article.

5. A recording medium which is readable by an article posting apparatus for referring to a posted article, or for posting an article, comprising:

program code means for causing said apparatus to store article identification information for identifying a posted article, coordinate data of said article identification information, information related to the position relationship of article identification information of an article with other posted articles which represents the intention of the article posting user transferred from an article relationship information managing apparatus which manages information related to the position relationship of article identification information of articles which represent the respective intentions of the posting users of the articles posted from a plurality of article posting apparatuses, and information which represents a posting order of the articles transferred from the article relationship information managing apparatus;

program code means for causing said apparatus to display the article identification information on the display screen at the position corresponding to the coordinate data of said identification information and overlaps the article identification information in an order corresponding to the transferred posting order information;

program code means for causing said apparatus to prepare the article identification information of the article to be posted;

program code means for causing said apparatus to allow a user to dispose the article identification information at a position on the display screen desirable to the user; program code means for causing said apparatus to detect coordinate data on the display screen of the article identification information disposed on the display screen;

program code means for causing said apparatus to store the article identification information disposed on the display screen and the detected coordinate data of said article identification information, wherein the program code means for causing said apparatus to store retains the article identification information, the detected coordinate data and the information which represents the posting order after the article identification information is no longer displayed; and program code means for causing said apparatus to transfer the stored data by said storing means to said apparatus for managing the article relationship information.

6. An article posting apparatus, comprising:

a posting device to allow users to post articles and designate coordinate data for each article;

a storing device to store the articles and the respective coordinate data, wherein the storing device retains the articles and the respective coordinate data after the article is no longer displayed;

a sharing device to share the articles and respective coordinate data between a plurality of users; and a displaying device to display and arrange the articles on a similar topic grouped together at a location on a screen according to the coordinate data of the article, and displaying the articles in an order corresponding to a shared posting order.

7. The article posting apparatus of claim 6, wherein the displaying device displays articles on a similar topic as overlapping.

8. The article posting apparatus of claim 7, wherein when the displaying device displays articles as overlapping, the extent of overlapping is determined by an extent of participation of an article.

9. The article posting apparatus of claim 6, wherein the displaying device displays articles that are close together in a same color.

10. The article posting apparatus of claim 6, wherein the displaying device displaying articles related to each-other adjacent to each-other, and displays articles using a different shape depending on contents of the article.

11. The article posting apparatus of claim 10 wherein, said contents of the article can be a question or an answer.

* * * * *